(12) United States Patent
Tahara et al.

(10) Patent No.: US 12,515,774 B2
(45) Date of Patent: Jan. 6, 2026

(54) ACTUATOR AND CABLE ASSEMBLY

(71) Applicant: HI-LEX CORPORATION, Takarazuka (JP)

(72) Inventors: Takayuki Tahara, Hyogo (JP); Genki Nakamori, Hyogo (JP)

(73) Assignee: HI-LEX CORPORATION, Takarazuka (JP)

( * ) Notice: Subject to any disclaimer, the term of this patent is extended or adjusted under 35 U.S.C. 154(b) by 680 days.

(21) Appl. No.: 17/949,271

(22) Filed: Sep. 21, 2022

(65) Prior Publication Data
US 2023/0096990 A1    Mar. 30, 2023

(30) Foreign Application Priority Data
Sep. 30, 2021   (JP) ................. 2021-162146

(51) Int. Cl.
*B63H 11/11*   (2006.01)
*B63B 34/10*   (2020.01)

(52) U.S. Cl.
CPC ............. *B63H 11/11* (2013.01); *B63B 34/10* (2020.02)

(58) Field of Classification Search
CPC ....... F16C 1/106; B63H 21/21; B63H 21/213; B63H 2021/216; B63H 11/11; B63H 11/113
See application file for complete search history.

(56) References Cited

U.S. PATENT DOCUMENTS

| | | | | |
|---|---|---|---|---|
| 5,515,748 A | * | 5/1996 | Yagi | G05G 11/00 192/69.7 |
| 2004/0127113 A1 | * | 7/2004 | Fuse | B63H 11/117 440/41 |

FOREIGN PATENT DOCUMENTS

| | | | |
|---|---|---|---|
| JP | 08-169399 | 7/1996 | |
| JP | 2004-098949 | 4/2004 | |
| WO | WO-2020198836 A1 * | 10/2020 | ............... F16C 1/18 |

\* cited by examiner

*Primary Examiner* — Andrew Polay
(74) *Attorney, Agent, or Firm* — Amin, Turocy & Watson, LLP

(57) ABSTRACT

Provided is an actuator including: a casing; and a cable driving part including a rotation member connected to a cable. The cable driving part moves the cable forward and backward by rotating the rotation member with a force of a motor based on an operation signal. The cable extends from a water flow direction changing part and is inserted into the casing. The water flow direction changing part changes a direction of a water flow to be ejected. The operation signal is an operation signal for operating the water flow direction changing part.

6 Claims, 8 Drawing Sheets

11

12

ACTUATOR AND CABLE ASSEMBLY

CROSS REFERENCE TO RELATED APPLICATIONS

This application is entitled to (or claims) the benefit of Japanese Patent Application No. 2021-162146, filed on Sep. 30, 2021, the disclosure of which including the specification, drawings and abstract is incorporated herein by reference in its entirety.

TECHNICAL FIELD

The present disclosure relates to an actuator and a cable assembly.

BACKGROUND ART

Patent Literature (hereinafter referred to as "PTL") 1 discloses a technique for driving a reverse bucket provided in the hull of a personal watercraft. The personal watercraft disclosed in PTL 1 includes: an operating lever disposed to be rotatable around a support shaft; a cable connected to the operating lever; a lever connected to the cable and disposed to be rotatable around a support bolt; and a reverse bucket which is rotated by the lever.

In a case where the operating lever is operated, the operating force is amplified by the operating lever, is subsequently transmitted via the cable to the lever, is further amplified by the lever, and is then transmitted to the reverse bucket. Thus, it is possible to manually rotate and drive the reverse bucket by utilizing the operating force.

CITATION LIST

Patent Literature

PTL 1
Japanese Patent Application Laid-Open No. 2004-98949

SUMMARY OF INVENTION

Technical Problem

However, since the prior art disclosed in PTL 1 utilizes a plurality of mechanical booster mechanisms in order to amplify the operating force, there is a problem that a space in which the mechanisms are capable of operating is required to be ensured and that it is impossible to respond to a desire to improve the degree of freedom in designing a hull.

An object of the present disclosure is to provide an actuator and a cable assembly each capable of improving the degree of freedom in designing a hull.

Solution to Problem

An actuator of the present disclosure includes: a casing; and a cable driving part including a rotation member connected to a cable. The cable driving part moves the cable forward and backward by rotating the rotation member with a force of a motor based on an operation signal. The cable extends from a water flow direction changing part and is inserted into the casing. The water flow direction changing part changes a direction of a water flow to be ejected. The operation signal is an operation signal for operating the water flow direction changing part.

A cable assembly of the present disclosure includes the actuator. In the cable assembly, the cable includes: an outer casing extending from inside the casing to outside the casing; an inner cable extending from the water flow direction changing part and being inserted into the casing via the outer casing; and a connection member connecting a leading end of the inner cable to the rotation member.

Advantageous Effects of Invention

According to the present disclosure, it is possible to obtain an actuator and a cable assembly each capable of improving the degree of freedom in designing a hull.

DESCRIPTION OF EMBODIMENTS

Figure 1:
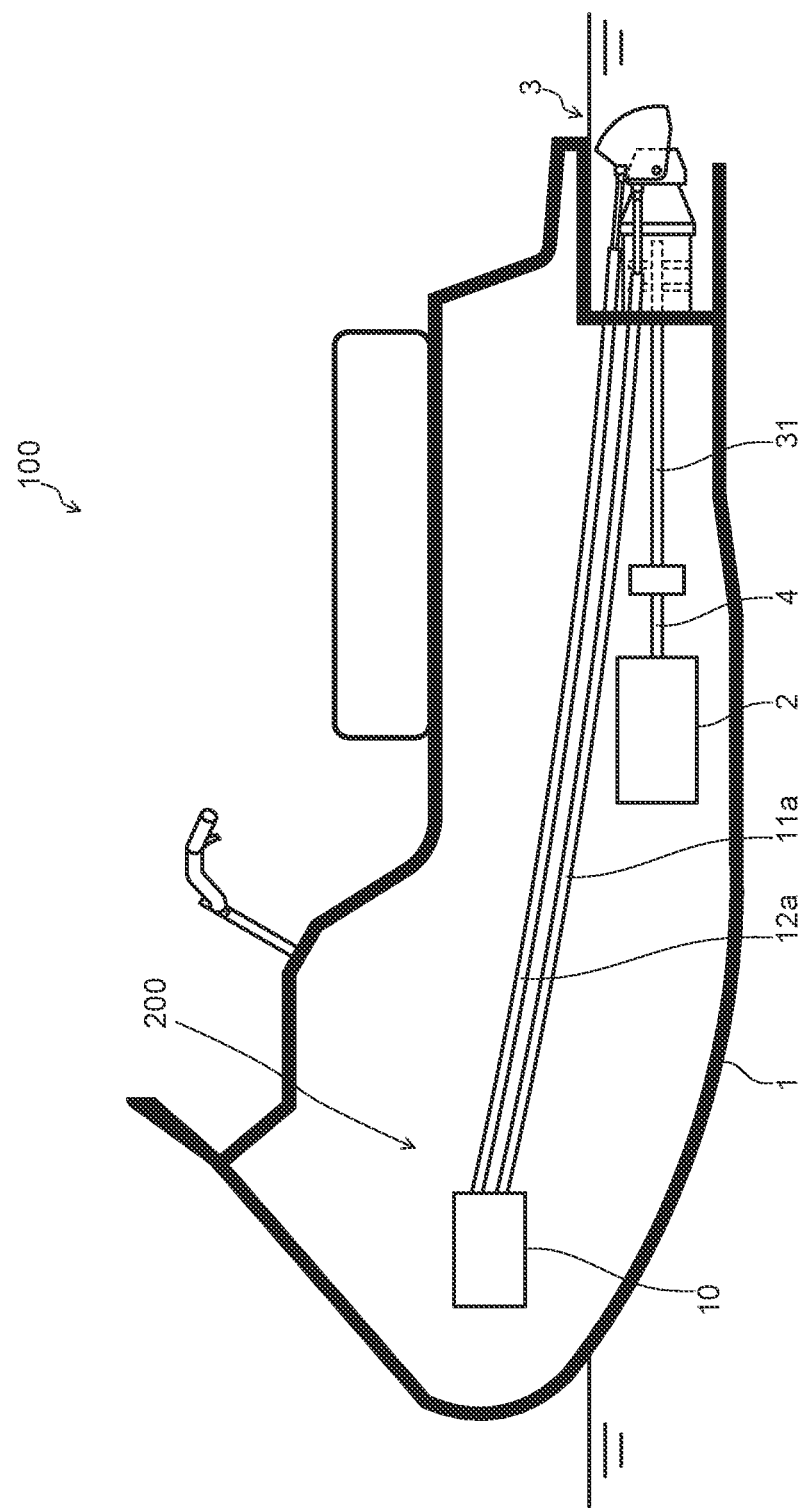
FIG. 1 illustrates a configuration example of personal watercraft 100 according to the present embodiment.

Hereinafter, the present embodiment will be described in detail with reference to the accompanying drawings.
(Personal Watercraft 100)
FIG. 1 illustrates a configuration example of personal watercraft 100 according to the present embodiment. Personal watercraft 100 includes hull 1, prime mover 2, propulsion mechanism 3, and cable assembly 200.
(Prime Mover 2)
Prime mover 2 is a motor, an internal combustion engine, or the like which drives propulsion mechanism 3. Prime mover 2 is connected to propulsion mechanism 3 via drive shaft 4 provided inside hull 1.
(Propulsion Mechanism 3)
Propulsion mechanism 3 is a mechanism that generates a propulsive force for propelling hull 1 by sucking water around hull 1 and ejecting the sucked water by the rotational force of prime mover 2.
(Drive Shaft 4)
Drive shaft 4 is connected to impeller shaft 31 that extends from propulsion mechanism 3. Impeller shaft 31 is a shaft for transmitting the rotational force of prime mover 2 to an impeller.

(Cable Assembly 200)

Cable assembly 200 includes actuator 10, first cable 11a, and second cable 12a. Cable assembly 200 is an apparatus for adjusting the angle of a water flow direction changing part provided in propulsion mechanism 3.

(Actuator 10)

Actuator 10 is connected to the water flow direction changing part via first cable 11a and second cable 12a. First cable 11a and second cable 12a are forward/backward movement members for adjusting the angle of the water flow direction changing part. Note that, details of actuator 10, first cable 11a, second cable 12a, and the water flow direction changing part will be described later, respectively.

Figure 2:
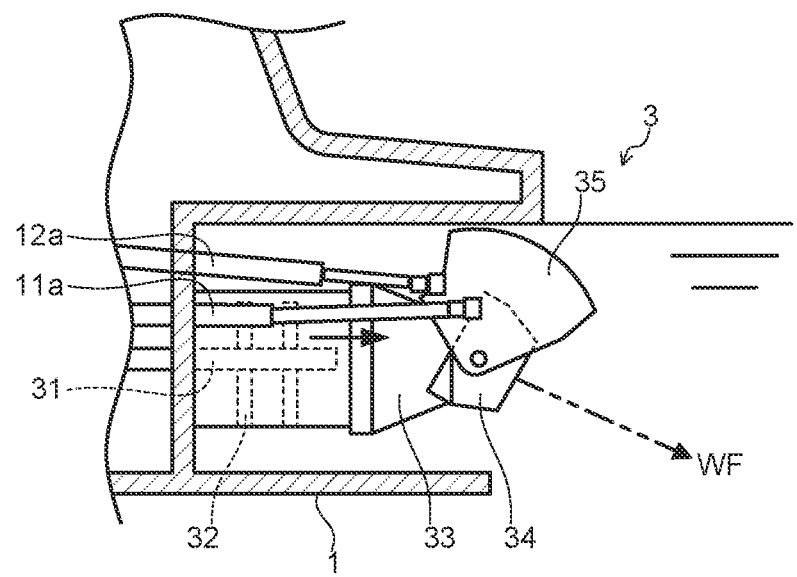
FIG. 2 illustrates a state of trim 34 before a direction of a water flow ejected by nozzle 33 is changed.
Figure 3:
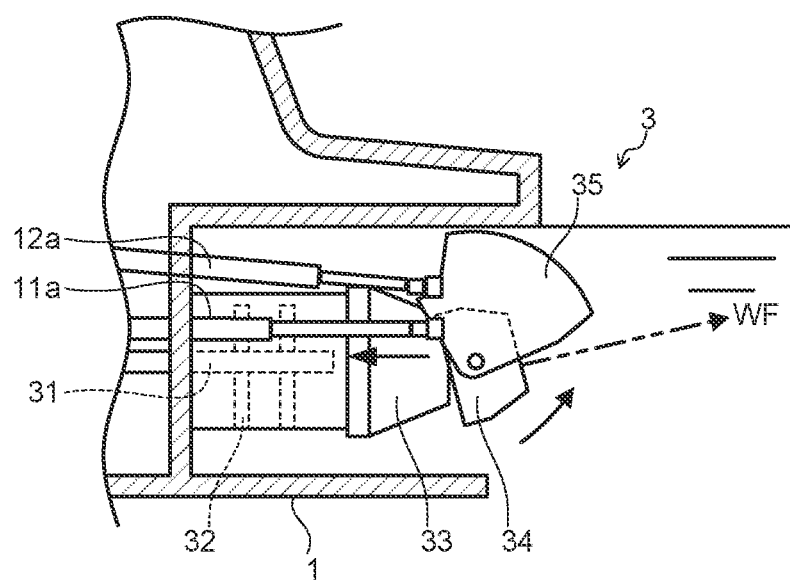
FIG. 3 illustrates a state of trim 34 after a direction of a water flow ejected by nozzle 33 is changed.
Figure 4:
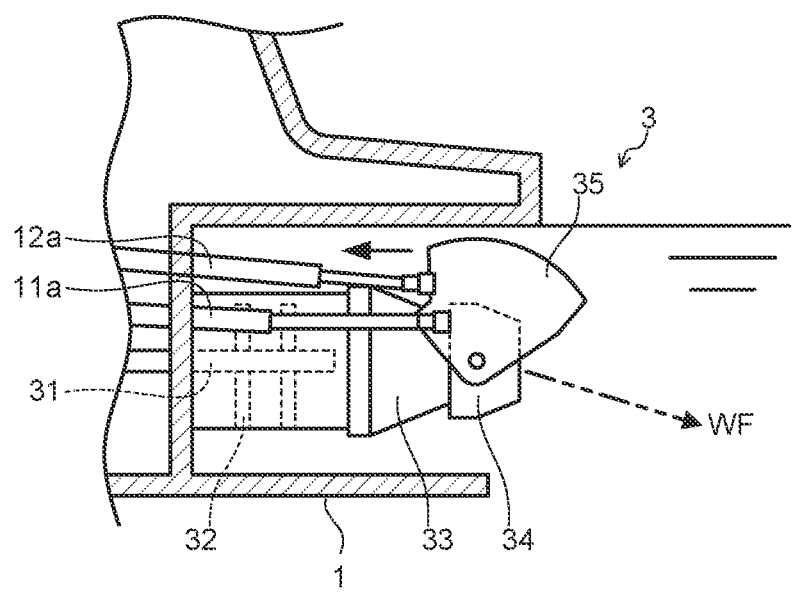
FIG. 4 illustrates a state of reverse bucket 35 when hull 1 moves forward.
Figure 5:
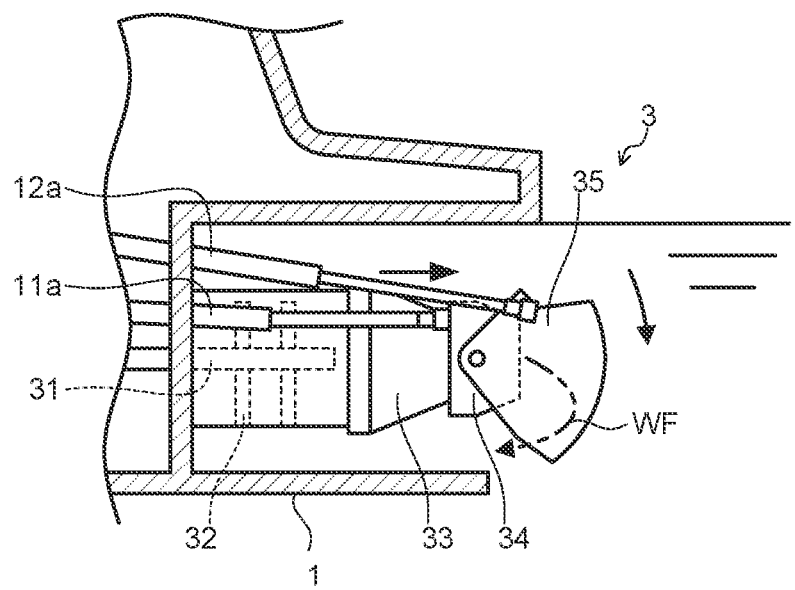
FIG. 5 illustrates a state of reverse bucket 35 when hull 1 moves backward.

Next, a configuration example of propulsion mechanism 3 will be described with reference to FIGS. 2, 3, 4, and 5. FIG. 2 illustrates a state of trim 34 before a direction of a water flow ejected by nozzle 33 is changed. FIG. 3 illustrates a state of trim 34 after a direction of a water flow ejected by nozzle 33 is changed. FIG. 4 illustrates a state of reverse bucket 35 when hull 1 moves forward. FIG. 5 illustrates a state of reverse bucket 35 when hull 1 moves backward.

Propulsion mechanism 3 includes impeller shaft 31, impeller 32, nozzle 33, trim 34, and reverse bucket 35.

(Impeller Shaft 31)

Impeller shaft 31 is connected to impeller 32. Impeller 32 is a rotor blade that sucks water by rotating together with impeller shaft 31 and ejects the sucked water from nozzle 33.

(Nozzle 33)

Nozzle 33 is a drain port for ejecting water, which is sucked by the rotation of impeller 32, in a specific direction.

(Trim 34)

Trim 34 is an example of the water flow direction changing part that changes a direction of a water flow ejected by nozzle 33 in order to change an inclination angle of hull 1 with respect to a horizontal direction. Trim 34 is disposed backward from nozzle 33.

First cable 11a extending from actuator 10 illustrated in FIG. 1 is connected to trim 34. Trim 34 operates so as to change a direction of a water flow ejected from nozzle 33 by first cable 11a moving forward and backward.

For example, in a case where first cable 11a moves forward toward trim 34, an outlet port of trim 34 is inclined downward as illustrated in FIG. 2, and thus, water flow WF ejected from nozzle 33 flows in an obliquely downward direction.

In a case where first cable 11a moves backward from trim 34 toward actuator 10 illustrated in to FIG. 1, the outlet port of trim 34 is inclined upward as illustrated in FIG. 3, and thus, water flow WF ejected from nozzle 33 flows in an obliquely upward direction.

(Reverse Bucket 35)

Reverse bucket 35 is an example of the water flow direction changing part that changes the direction of water flow WF ejected from trim 34. Reverse bucket 35 is disposed backward from trim 34 when trim 34 is viewed from the bow of hull 1.

Second cable 12a extending from actuator 10 illustrated in FIG. 1 is connected to reverse bucket 35. Reverse bucket 35 connected to second cable 12a operates so as to change the direction of water flow WF ejected from trim 34 by second cable 12a moving forward and backward.

For example, in a case where second cable 12a moves backward from reverse bucket 35 toward actuator 10 illustrated in FIG. 1, reverse bucket 35 rotates so as to open the outlet port of trim 34 as illustrated in FIG. 4.

In this case, water flow WF ejected from trim 34 flows backward from hull 1. Thus, hull 1 can be moved forward.

In a case where second cable 12a moves forward toward reverse bucket 35 from the above state, reverse bucket 35 rotates so as to close the outlet port of trim 34 as illustrated in FIG. 5.

In this case, water flow WF ejected from trim 34 flows obliquely forward from hull 1. Thus, hull 1 can be moved backward.

Figure 6:
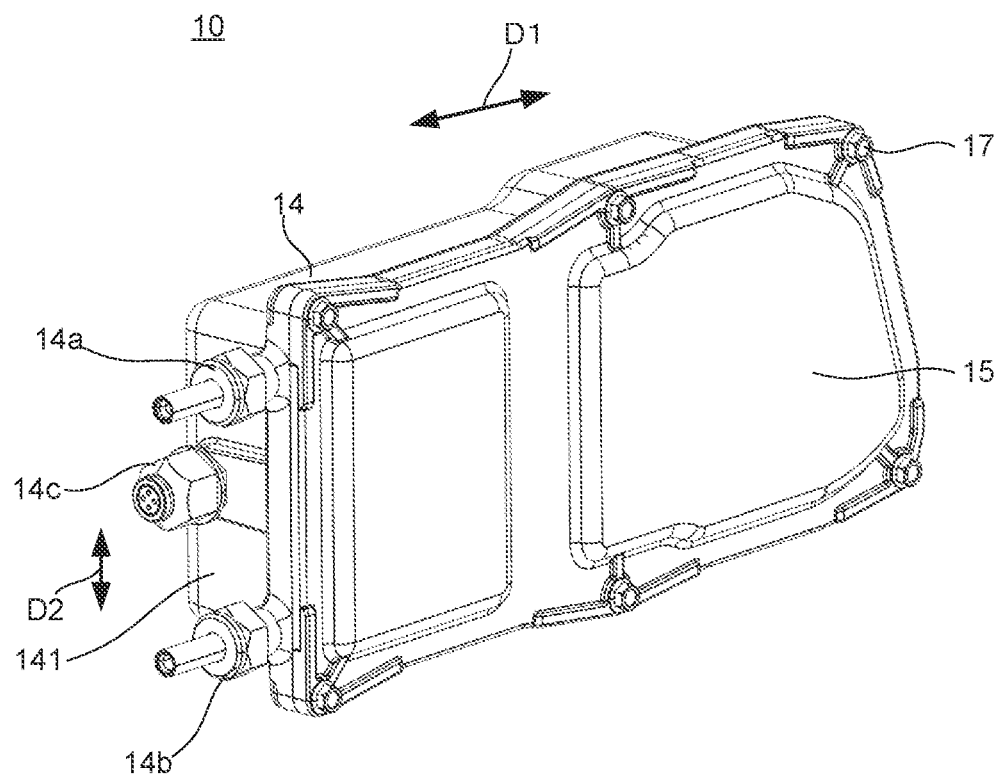
FIG. 6 is an external view of actuator 10.
Figure 7:
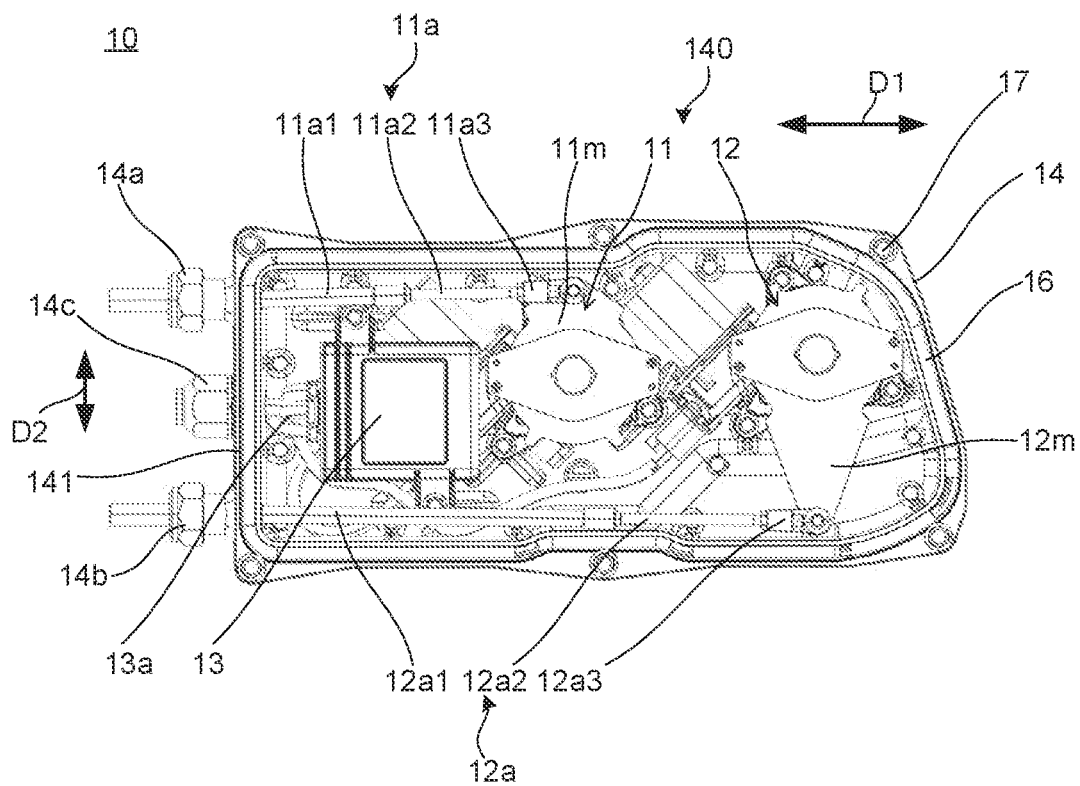
FIG. 7 is an internal view of actuator 10.

Next, a configuration example of actuator 10 that drives trim 34 and reverse bucket 35 will be described with reference to FIGS. 6 and 7. FIG. 6 is an external view of actuator 10, and FIG. 7 is an internal view of actuator 10.

(Actuator 10)

Actuator 10 includes: ECU (Electronic Control Unit) 13; casing 14; lid 15 which closes an opening part of casing 14; sealing member 16; and cable driving part 140.

Actuator 10 moves a cable forward and backward by rotating a rotation member with a force of a motor based on an operation signal. The operation signal includes: a trim operation signal transmitted from a trim operation part (not illustrated); a nozzle operation signal transmitted from a nozzle operation part (not illustrated); and the like.

The trim operation part is a switch operated by a person for adjusting the angle of trim 34 illustrated in FIG. 4. The nozzle operation part is a switch for setting the angle of reverse bucket 35 illustrated in FIG. 4 to a forward shift position, a backward shift position, or the like.

(Casing 14)

Casing 14 houses ECU 13 and cable driving part 140. Casing 14 has an approximately rectangular parallelepiped shape in which a length of casing 14 in extension direction D1 of each of first cable 11a and second cable 12a, which are connected to cable driving part 140, is longer than a length of casing 14 in direction D2 orthogonal to extension direction D1.

Casing 14 includes short side part 141 provided with cable lead-in part 14a, cable lead-in part 14b, and wiring lead-in part 14c.

Cable lead-in part 14a includes: an lead-in hole for introducing first cable 11a into casing 14; and a sealing structure. This sealing structure prevents water from entering casing 14 from outside the casing via a gap between the lead-in hole and first cable 11a.

Cable lead-in part 14b includes: an lead-in hole for introducing second cable 12a into casing 14; and a sealing structure. This sealing structure prevents water from entering casing 14 from outside the casing via a gap between the lead-in hole and second cable 12a.

Wiring lead-in part 14c includes: an lead-in hole for introducing cable group 13a, which is connected to ECU 13, into casing 14; and a sealing structure that prevents water from entering casing 14 from outside the casing via a gap between the lead-in hole and cable group 13a.

Cable group 13a includes: wire for supplying power to ECU 13 and the motor; wire through which the operation signal described above is transmitted; and the like.

(Lid 15)

Lid 15 is fixed to casing 14 so as to close the opening part of casing 14. Fastening member 17 is used for fixing lid 15 to casing 14.

(Sealing Member 16)

Sealing member 16 is a member that seals an inner space of casing 14. Sealing member 16 is formed of an elastic material such as silicone rubber, which is excellent in water resistance, heat resistance, and chemical resistance. Sealing member 16 is provided in an edge part that forms the opening part of casing 14.

Lid 15 is screwed to casing 14, and thus, sealing member 16 is compressed and a gap between casing 14 and lid 15 becomes narrower. Thus, the inner space of casing 14 is sealed.

(First Cable 11a)

First cable 11a includes: outer casing 11a1; inner cable 11a2 which extends from trim 34 and is inserted into casing 14 via outer casing 11a1; and connection member 11a3 which connects a leading end of inner cable 11a2 to rotation member 11m.

Outer casing 11a1 is a hollow member that extends a certain distance from cable lead-in part 14a toward outside casing 14 and extends a certain distance from cable lead-in part 14a toward inside casing 14. Note that, in the present embodiment, outer casing 11a1 is formed of a hollow member, which extends a certain distance from cable lead-in part 14a toward inside casing 14, and a flexible hollow member, which extends a certain distance from cable lead-in part 14a toward outside casing 14.

Outer casing 11a1 guides inner cable 11a2 from inside casing 14 to outside casing 14 or from outside casing 14 to inside casing 14 while retaining a certain region in the extension direction of inner cable 11a2. Thus, it is possible to route inner cable 11a2 in a predetermined path.

Both end parts of outer casing 11a1 are provided with cap members each of which fills a gap between inner cable 11a2 and outer casing 11a1.

Inner cable 11a2 is a flexible cable in which a resin is coated on the surface of a wire formed by winding a steel wire in a spiral manner. In the present embodiment, a solid rod member is connected to a leading end of a main body of inner cable 11a2, connection member 11a3 is connected to a side of a leading end of the rod member, the main body of inner cable 11a2 is disposed inside outer casing 11a1, and the rod member is disposed so as to be exposed from outer casing 11a1.

Connection member 11a3 is a member in which a coupling part, which is coupled to inner cable 11a2, and an engagement hole, into which a locking pin is inserted, are integrally formed. The locking pin is a metallic columnar member. Inner cable 11a2 is connected to rotation member 11m via the locking pin by insertion of the locking pin into the engagement hole.

(Second Cable 12a)

Second cable 12a includes: outer casing 12a1; inner cable 12a2 which extends from reverse bucket 35 and is inserted into casing 14 via outer casing 12a1; and connection member 12a3 which connects a leading end of inner cable 12a2 to rotation member 12m.

Outer casing 12a1 is a hollow member that extends a certain distance from cable lead-in part 14b toward outside casing 14 and extends a certain distance from cable lead-in part 14b toward inside casing 14. Note that, in the present embodiment, outer casing 12a1 is formed of a hollow member, which extends a certain distance from cable lead-in part 14b toward inside casing 14, and a flexible hollow member, which extends a certain distance from cable lead-in part 14b toward outside casing 14.

Outer casing 12a1 guides inner cable 12a2 from inside casing 14 to outside casing 14 or from outside casing 14 to inside casing 14 while retaining a certain region in the extension direction of inner cable 12a2. Thus, it is possible to route inner cable 12a2 in a predetermined path.

Both end parts of outer casing 12a1 are provided with cap members each of which fills a gap between inner cable 12a2 and outer casing 12a1.

As with inner cable 11a2, inner cable 12a2 is a flexible cable in which a resin is coated on the surface of a wire formed by winding a steel wire in a spiral manner. In the present embodiment, a solid rod member is connected to a leading end of a main body of inner cable 12a2, connection member 12a3 is connected to a side of a leading end of the rod member, the main body of inner cable 12a2 is disposed inside outer casing 12a1, and the rod member is disposed so as to be exposed from outer casing 12a1.

Connection member 12a3 is a member in which a coupling part, which is coupled to inner cable 12a2, and an engagement hole, into which a locking pin is inserted, are integrally formed. Inner cable 12a2 is connected to rotation member 12m via the locking pin by insertion of the locking pin into the engagement hole.

(Cable Driving Part 140)

Cable driving part 140 includes: first cable driving part 11 that moves first cable 11a forward and backward; second cable driving part 12 that moves second cable 12a forward and backward; and ECU 13 that controls first cable driving part 11 and second cable driving part 12.

Figure 8:
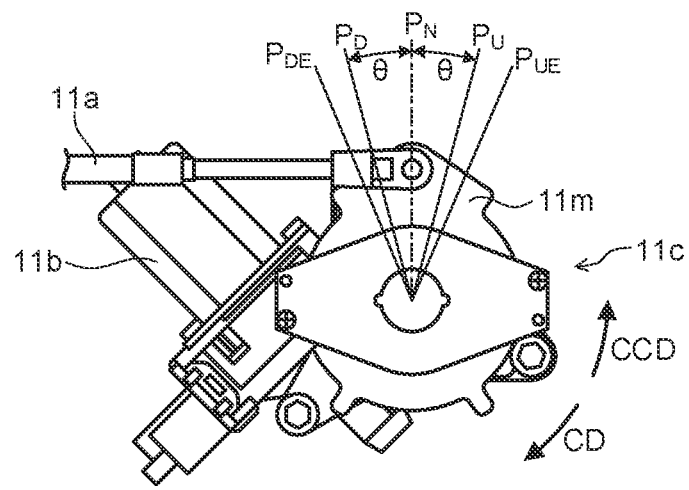
FIG. 8 is an external view of first cable driving part 11.

Next, a configuration of first cable driving part 11 will be specifically described with reference to FIG. 8. FIG. 8 is an external view of first cable driving part 11.

(First Cable Driving Part 11)

First cable driving part 11 includes: first motor 11b that is a power source for driving first cable 11a; and first driving part 11c that drives first cable 11a by transmitting the rotational motion of first motor 11b to first cable 11a.

First driving part 11c includes rotation member 11m. First cable 11a is connected to rotation member 11m. The rotation of rotation member 11m causes the rotational motion of first motor 11b to be converted into a linear motion for first cable 11a to move linearly.

Rotation member 11m rotates in first rotation direction CD or rotates in second rotation direction CCD opposite to the first rotation direction around neutral position $P_N$ in the rotation direction of rotation member 11m. First rotation direction CD is a direction in which rotation member 11m is rotated clockwise.

Neutral position $P_N$ is the intermediate position when rotation member 11m rotates from up position $P_U$ to down position $P_D$.

Up position $P_U$ is a position at which the angle of trim 34 is set to a predetermined angle such that the outlet port of trim 34 illustrated in FIG. 4 faces obliquely upward.

Up position $P_U$ is, for example, a reference position in the rotation direction of rotation member 11m, where the reference position is set in a case where a button provided in the trim operation part described above is pressed.

Further, up position $P_U$ is, for example, a rotational position that is set when actuator 10 is shipped to an assembly plant of hull 1 in order to assemble actuator 10 to hull 1 illustrated in FIG. 1.

Down position $P_D$ is a position at which the angle of trim 34 is set to a predetermined angle such that the outlet port of trim 34 illustrated in FIG. 4 faces obliquely downward.

Rotation angle θ when rotation member 11m rotates from neutral position $P_N$ to up position $P_U$ in first rotation direction CD is equal to rotation angle θ when rotation member 11m rotates from neutral position $P_N$ to down position $P_D$ in second rotation direction CCD. Note that, neutral position $P_N$ of rotation member 11m may not be the intermediate position when rotation member 11m rotates from up position $P_U$ to down position $P_D$ as long as neutral position $P_N$ is a position at which water flow WF ejected from nozzle 33 flows out from the outlet port of trim 34 approximately horizontally.

Figure 9:
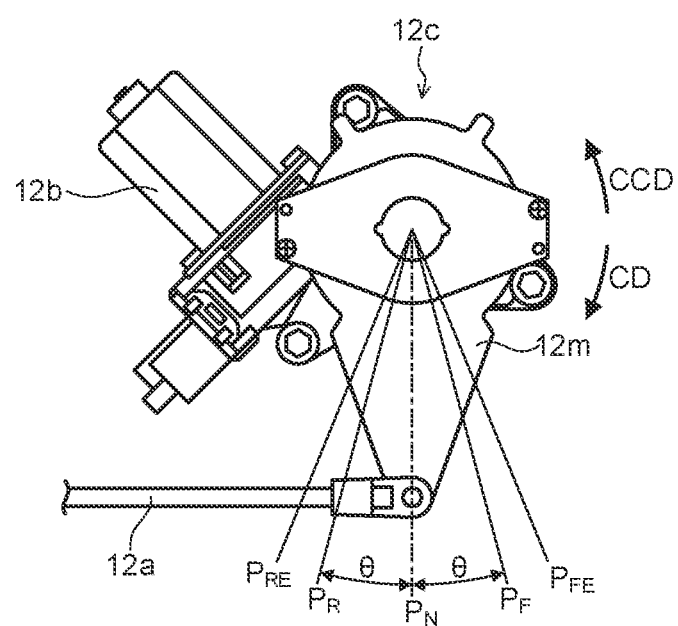
FIG. 9 is an external view of second cable driving part 12.

Next, a configuration example of second cable driving part 12 will be described with reference to FIG. 9. FIG. 9 is an external view of second cable driving part 12.

(Second Cable Driving Part 12)

Second cable driving part 12 includes: second motor 12*b* that is a power source for driving second cable 12*a*; and second driving part 12*c* that drives second cable 12*a* by transmitting the rotational motion of second motor 12*b* to second cable 12*a*.

Second driving part 12*c* includes rotation member 12*m*. Second cable 12*a* is connected to rotation member 12*m*. The rotation of rotation member 12*m* causes the rotational motion of second motor 12*b* to be converted into a linear motion for second cable 12*a* to move linearly.

Rotation member 12*m* rotates in first rotation direction CD or rotates in second rotation direction CCD opposite to first rotation direction CD from neutral position $P_N$ in the rotation direction of rotation member 12*m*. First rotation direction CD is a direction in which rotation member 12*m* is rotated clockwise.

Neutral position $P_N$ is the intermediate position when rotation member 12*m* rotates from reverse position $P_R$ to forward position $P_F$. Hull 1 stops or moves forward at a very slow speed at neutral position $P_N$ since reverse bucket 35 is located at the intermediate position.

Forward position $P_F$ is a position at which the angle of reverse bucket 35 is set to a predetermined angle such that reverse bucket 35 illustrated in FIG. 4 opens the outlet port of trim 34.

Reverse position $P_R$ is a position at which the angle of reverse bucket 35 is set to a predetermined angle such that reverse bucket 35 illustrated in FIG. 4 closes the outlet port of trim 34.

Reverse position $P_R$ is, for example, a reference position in the rotation direction of rotation member 12*m*, where the reference position is set in a case where a button provided in the bucket operation part described above is pressed.

Further, reverse position $P_R$ is, for example, a rotational position that is set when actuator 10 is shipped to an assembly plant of hull 1 in order to assemble actuator 10 to hull 1 illustrated in FIG. 1.

Rotation angle θ when rotation member 12*m* rotates from neutral position $P_N$ to reverse position $P_R$ in first rotation direction CD is equal to rotation angle θ when rotation member 12*m* rotates from neutral position $P_N$ to forward position $P_F$ in second rotation direction CCD. Note that, neutral position $P_N$ of rotation member 12*m* may not be the intermediate position of rotation angle when rotation member 12*m* rotates from forward position $P_F$ to reverse position $P_R$ in first rotation direction CD as long as hull 1 can maintain a stopped state or hull 1 can move forward at a very slow speed.

Next, a configuration of second driving part 12*c* illustrated in FIG. 9 will be described in detail with reference to FIGS. 10, 11, and 12. Note that, first driving part 11*c* illustrated in FIG. 8 is configured in the same manner as second driving part 12*c*.

Accordingly, hereinafter, the configuration of second driving part 12*c* will be described, and a description of details of the configuration of first driving part 11*c* will be omitted.

(Second Driving Part 12*c*)

Figure 10:
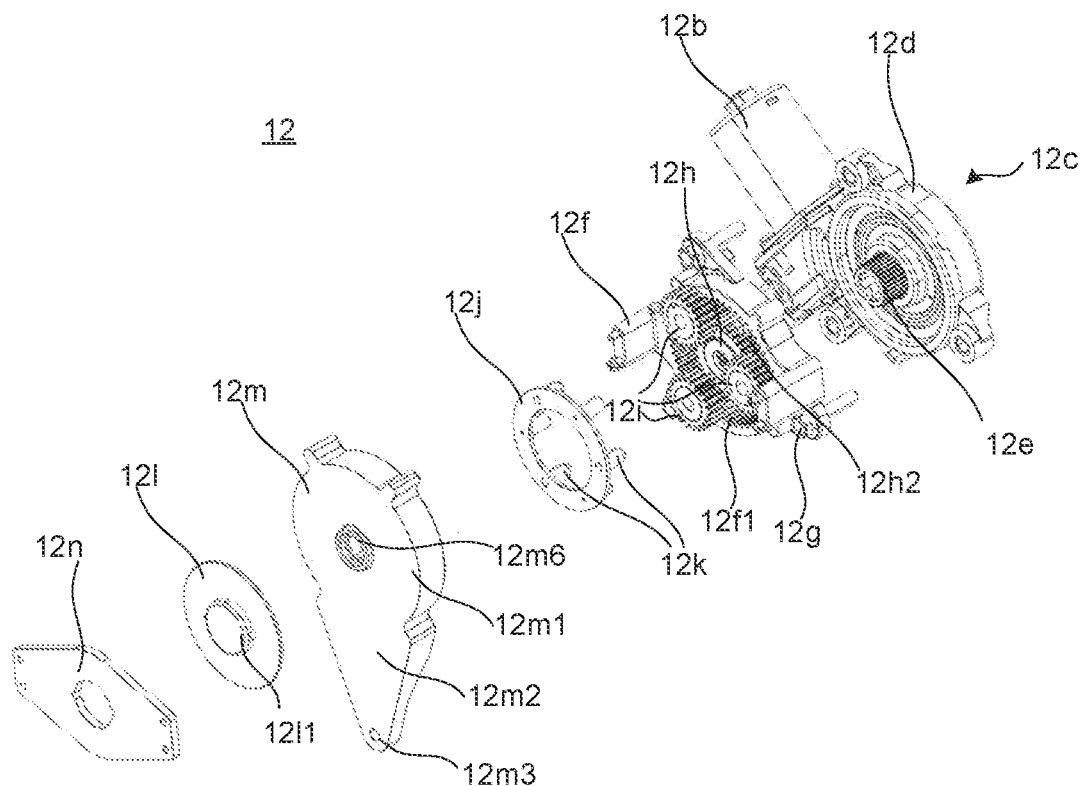
FIG. 10 is an exploded perspective view of second driving part 12c.
Figure 11:
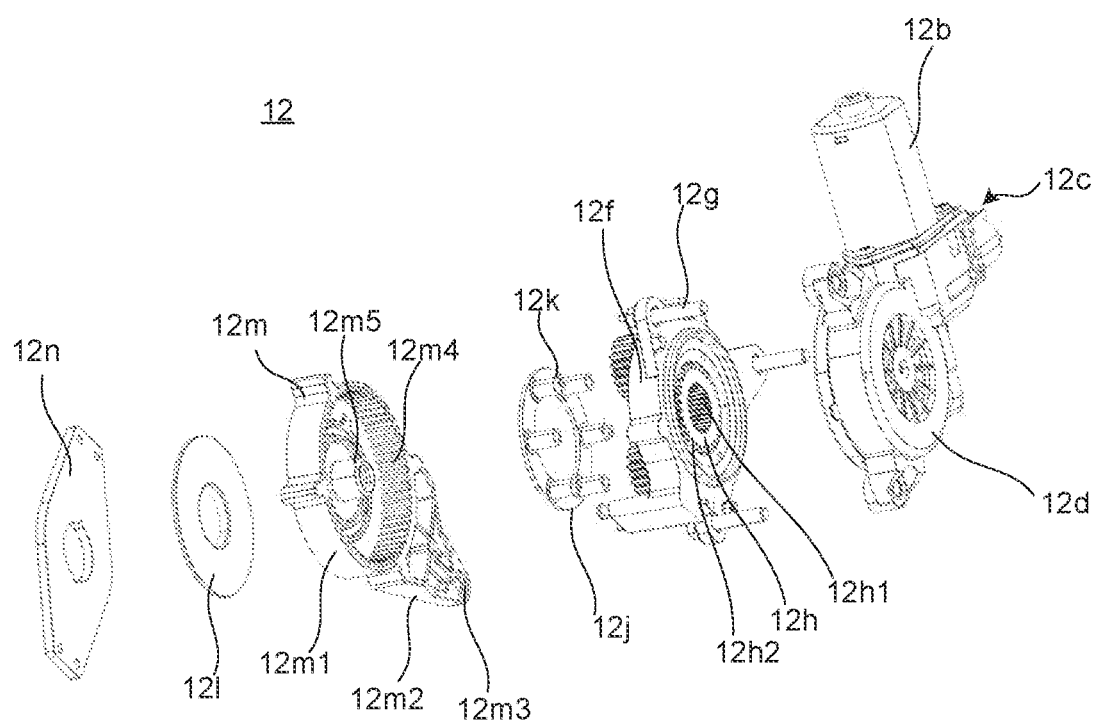
FIG. 11 is an exploded perspective view of second driving part 12c.
Figure 12:
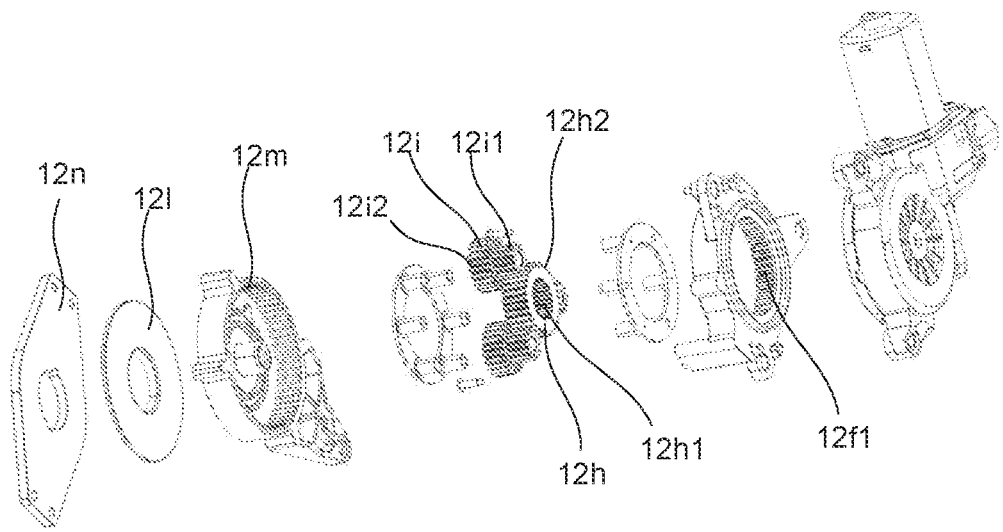
FIG. 12 is an exploded perspective view of second driving part 12c.

FIGS. 10, 11, and 12 are exploded perspective views of second driving part 12*c*, respectively. Second driving part 12*c* includes housing 12*d*, rotation gear 12*e*, housing 12*f*, fastening member 12*g*, input gear 12*h*, planetary gear 12*i*, carrier plate 12*j*, support shaft 12*k*, rotation member 12*m*, bush 121, and support plate 12*n*.

Housing 12*d*, rotation gear 12*e*, housing 12*f*, input gear 12*h*, carrier plate 12*j*, rotation member 12*m*, bush 121, and support plate 12*n* are arranged coaxially in this order.

Housing 12*d* fixes second motor 12*b* and houses rotation gear 12*e*. Rotation gear 12*e* is a gear in which a worm gear, a worm wheel, and the like for decelerating the rotation of second motor 12*b* and transmitting the rotational force thereof to input gear 12*h* are combined.

Rotation gear 12*e* includes a gear shaped to protrude from housing 12*d* toward housing 12*f*. This gear meshes with input gear 12*h* housed in housing 12*f*.

Input gear 12*h* is a gear that decelerates the rotation of rotation gear 12*e* and transmits the rotational force thereof to a plurality of planetary gears 12*i*. In housing 12*f*, input gear 12*h* is provided coaxially with the gear of rotation gear 12*e*, which is shaped to protrude toward housing 12*f*.

As illustrated in FIG. 12, internal gear 12*h*1 is formed in the inner peripheral part of input gear 12*h*. Internal gear 12*h*1 is a gear that meshes with rotation gear 12*e* illustrated in FIG. 10.

Further, external gear 12*h*2 is formed in the outer peripheral part of input gear 12*h*. External gear 12*h*2 is a gear that meshes with each first gear 12*i*1 of planetary gears 12*i*.

Planetary gear 12*i* includes first gear 12*i*1 and second gear 12*i*2 which differ in outer diameter from each other. First gear 12*i*1 and second gear 12*i*2 are coaxially provided.

First gear 12*i*1 is a gear whose outer diameter is smaller than the outer diameter of second gear 12*i*2. First gear 12*i*1 meshes with external gear 12*h*2 of input gear 12*h* and also meshes with internal gear 12*f*1 formed in the inner peripheral part of housing 12*f* illustrated in FIG. 10.

Second gear 12*i*2 is a gear that meshes with internal gear 12*m*4 of annular part 12*m*1 illustrated in FIG. 11. Annular part 12*m*1 forms apart of rotation member 12*m* and is formed in an annular shape so as to surround the plurality of planetary gears 12*i*. Internal gear 12*m*4 is a gear that meshes with each of the plurality of planetary gears 12*i*. Internal gear 12*m*4 is formed in the inner peripheral part of annular part 12*m*1.

Rotation gear 12*e*, input gear 12*h*, planetary gears 12*i*, internal gear 12*f*1, and internal gear 12*m*4 form a planetary gear mechanism that transmits the rotation of second motor 12*b* to rotation member 12*m*.

Since the reduction gear ratio can be increased by providing each planetary gear 12*i* with first gear 12*i*1 and second gear 12*i*2 which have different outer diameters, it is possible to increase the rotation torque of rotation member 12*m* while suppressing an increase in the size of housing 12*f*.

Further, since the rotation torque of rotation member 12*m* can be increased, it is possible to produce second cable driving part 12 without using a special-specification motor of a high torque type. Accordingly, the degree of freedom in designing second cable driving part 12 improves and the production cost of second cable driving part 12 can be reduced.

Further, even in a case where a large tensile force is applied to rotation member 12*m* by a large external force acting on reverse bucket 35, it is possible to suppress breakage of planetary gears 12*i* by adopting a structure in which internal gear 12*m*4 of rotation member 12*m* meshes with each second gear 12*i*2 having a large outer diameter. Accordingly, the durability of second driving part 12*c* improves, an increase in the maintenance cost of second driving part 12*c* can be suppressed, and further the reliability of second driving part 12*c* significantly improves.

The outer peripheral part of annular part 12*m*1 is provided with arm 12*m*2. Arm 12*m*2 extends a certain distance in a radial direction of annular part 12*m*1 from the outer peripheral part of annular part 12*m*1.

Insertion hole 12*m*3 is formed near a leading end of arm 12*m*2. The locking pin described above is inserted into insertion hole 12*m*3.

Carrier plate 12*j* is provided between annular part 12*m*1 and housing 12*f*.

The surface of carrier plate 12*j*, which faces housing 12*f*, is provided with a plurality of support shafts 12*k*. The plurality of support shafts 12*k* is arranged at a certain distance away from each other in the circumferential direction of carrier plate 12*j*. Each support shaft 12*k* is inserted into a hole formed in the center of each planetary gear 12*i*. Thus, each planetary gear 12*i* is rotatably supported by each support shaft 12*k*.

Accordingly, even in a case where the plurality of planetary gears 12*i* moves on internal gear 12*f*1 of housing 12*f* along with the rotation of input gear 12*h*, it is possible to prevent the plurality of planetary gears 12*i* from coming into contact with each other.

Note that, although second driving part 12*c* according to the present embodiment is provided with three planetary gears 12*i*, the number of planetary gears 12*i* is not limited to three, but may be two or more. In a case where the number of planetary gears 12*i* is three or more, however, rotation member 12*m* can be stably installed with respect to planetary gears 12*i*, and further, since the contact area between the plurality of planetary gears 12*i* and internal gear 12*m*4 of rotation member 12*m* increases, the rotation of rotation member 12*m* can be stabilized and the mechanical strength of second driving part 12*c* can also be improved. Accordingly, the number of planetary gears 12*i* is preferably three or more.

Further, the plurality of planetary gears 12*i* is preferably arranged at a certain distance away from each other and at equal intervals in the circumferential direction of carrier plate 12*j*. This configuration makes it possible to further stabilize the rotation of rotation member 12*m*.

Bush 121 is an annular member provided between rotation member 12*m* and support plate 12*n*. The provision of bush 121 makes it possible to reduce the rotational sliding resistance of rotation member 12*m*. Accordingly, wear of rotation member 12*m* is suppressed and the durability of second driving part 12*c* improves.

Insertion shaft 1211 is formed in the center of bush 121. Insertion shaft 1211 is configured such that insertion shaft 1211 on a side of support plate 12*n* is convex and insertion shaft 1211 on a side of rotation member 12*m* is concave, and the convex portion of insertion shaft 1211 on the side of support plate 12*n* is inserted into a shaft hole provided in support plate 12*n*.

Shaft part 12*m*5 is provided at the center of annular part 12*m*1. Shaft part 12*m*5 protrudes on a side of housing 12*f* and is inserted into carrier plate 12*j*. A leading end of shaft part 12*m*5 is connected to an end surface of input gear 12*h* to prevent input gear 12*h* from floating. Shaft part 12*m*6 is provided at the center of annular part 12*m*1. Shaft part 12*m*6 is shaped to protrude on a side of bush 121, and is rotatably supported by being inserted into a concave portion of bush 121 on a side of rotation member 12*m*.

Support plate 12*n* is provided via bush 121 on the surface of annular part 12*m*1, which is opposite to the surface of annular part 12*m*1 on a side of housing 12*f*. Support plate 12*n* is screwed to housing 12*f* while rotatably supporting rotation member 12*m*.

Thus, while rotation member 12*m* assembled to housing 12*f* is prevented from falling off housing 12*f*, the rotation of rotation member 12*m* is allowed. Housing 12*f* is fixed to housing 12*d* by fastening member 12*g*.

When second motor 12*b* rotates in second cable driving part 12 configured in the above-described manner, the rotational force of second motor 12*b* is transmitted from rotation gear 12*e* to input gear 12*h*, and input gear 12*h* rotates.

When input gear 12*h* rotates, planetary gears 12*i* move while rotating on internal gear 12*f*1 of housing 12*f*. At this time, the rotation of input gear 12*h* is decelerated by planetary gears 12*i*. In addition, the rotation of planetary gears 12*i* are further decelerated by the two types of gears that form each planetary gear 12*i*. When the rotational force of planetary gears 12*i* is transmitted to annular part 12*m*1, arm 12*m*2 connected to annular part 12*m*1 rotates around annular part 12*m*1.

Thus, second cable 12*a* connected to arm 12*m*2 moves forward and backward, and reverse bucket 35 connected to second cable 12*a* operates.

Figure 13:
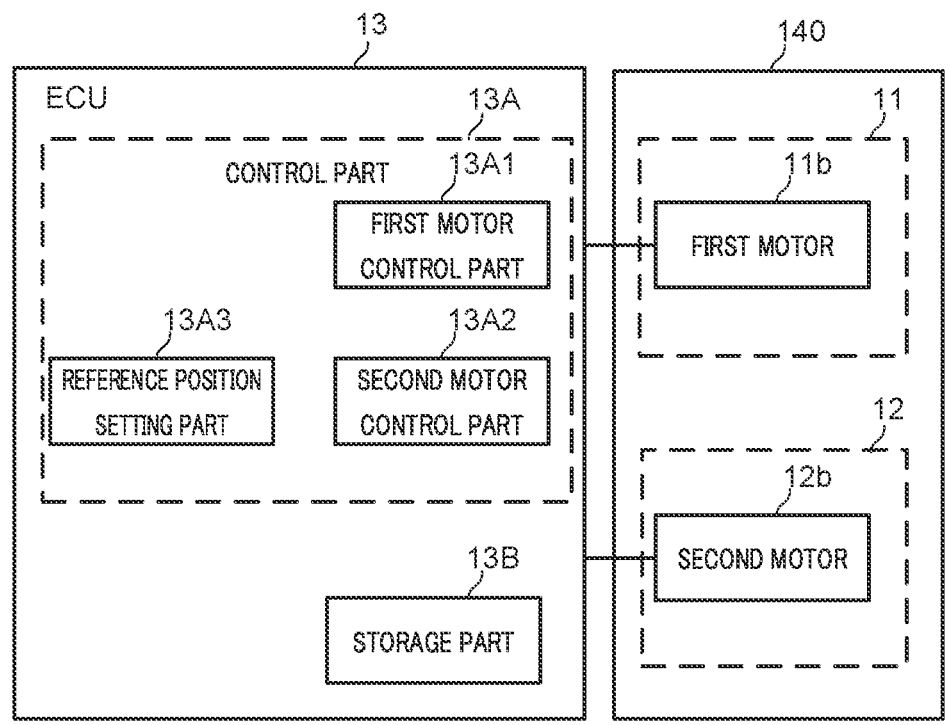
FIG. 13 illustrates a configuration example of ECU 13.

Next, a configuration example of ECU 13 will be described with reference to FIG. 13. FIG. 13 illustrates a configuration example of ECU 13.

(ECU 13)

ECU 13 is a microcomputer that controls cable driving part 140. ECU 13 includes: control part 13A formed of a central processing unit (CPU) and the like; and storage part 13B formed of a memory and the like.

(Control Part 13A)

Control part 13A includes first motor control part 13A1, second motor control part 13A2, and reference position setting part 13A3.

(First Motor Control Part 13A1)

First motor control part 13A1 controls the rotation amount of first motor 11*b* based on a trim operation signal transmitted from the trim operation part described above.

(Second Motor Control Part 13A2)

Second motor control part 13A2 controls the rotation amount of second motor 12*b* based on a nozzle operation signal transmitted from the nozzle operation part described above.

(Storage Part 13B)

Storage part 13B stores information on neutral position $P_N$, up position $P_U$, and down position $P_D$ in the rotation direction of rotation member 11*m* illustrated in FIG. 5.

Further, storage part 13B stores information on neutral position $P_N$, forward position $P_F$, and reverse position $P_R$ in the rotation direction of rotation member 12*m* illustrated in FIG. 6.

(Reference Position Setting Part 13A3)

Reference position setting part 13A3 sets, before first cable 11*a* is connected, up position $P_U$ which is the reference position in the rotation direction of first cable driving part 11 illustrated in FIG. 8, to a predetermined position based on the rotation amount of first motor 11*b*. Reference position setting part 13A3 updates the information on up position $P_U$ stored in storage part 13B to the predetermined position.

Further, reference position setting part 13A3 sets, before second cable 12*a* is connected, reverse position $P_R$ which is the reference position in the rotation direction of second cable driving part 12 illustrated in FIG. 9, to a predetermined position based on the rotation amount of second motor 12b. Reference position setting part 13A3 updates the information on reverse position $P_R$ stored in storage part 13B to the predetermined position.

Figure 14:
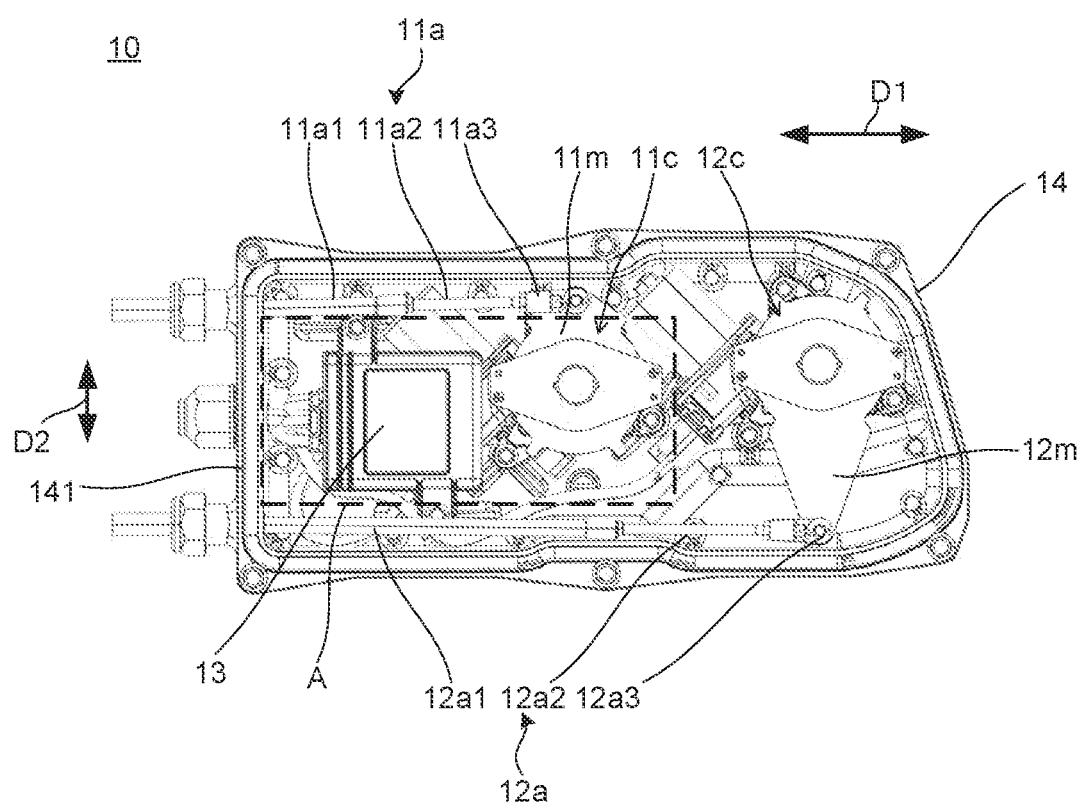
FIG. 14 is a diagram provided for describing a position at which first driving part 11c is disposed.

Next, a position at which first driving part 11c is disposed will be described with reference to FIG. 14. FIG. 14 is a diagram provided for describing a position at which first driving part 11c is disposed.

As illustrated in FIG. 14, first driving part 11c is disposed, inside casing 14, in region A between first cable 11a and second cable 12a and at a position closer to a side where first cable 11a and second cable 12a are inserted into casing 14 (a side of short side part 141 of casing 14) than second driving part 12c is.

The configuration in the above-described manner makes it unnecessary to dispose first driving part 11c away from second driving part 12c in extension direction D1 in order to prevent first cable 11a connected to first driving part 11c from interfering with second driving part 12c, and further makes it unnecessary to dispose first driving part 11c away from second driving part 12c in direction D2 orthogonal to extension direction D1.

As a result, there is no redundant space inside casing 14, actuator 10 illustrated in FIG. 1 can be miniaturized, and the degree of freedom in designing hull 1 of personal watercraft 100 improves.

Further, as illustrated in FIG. 14, first driving part 11c is provided between ECU 13, which forms the control part, and second driving part 12c.

The configuration in the above-described manner makes it unnecessary to provide a redundant space inside casing 14 in order to avoid causing rotation member 12m of second driving part 12c to interfere with ECU 13.

As a result, actuator 10 can be further miniaturized, and the degree of freedom in designing hull 1 of personal watercraft 100 further improves.

Further, as illustrated in FIG. 14, in casing 14 having an approximately rectangular parallelepiped shape in which a length of casing 14 along extension direction D1 is longer than a length of casing 14 along direction D2 orthogonal to extension direction D1, first driving part 11c and second driving part 12c are arranged along extension direction D1 of first cable 11a and second cable 12a.

The above-described configuration makes it possible to omit the space of a region between first driving part 11c or second driving part 12c and short side part 141 of casing 14, in comparison with a case where first driving part 11c and second driving part 12c are arranged along direction D2 orthogonal to extension direction D1 and ECU 13 is disposed in the region.

As a result, actuator 10 can be further miniaturized, and the degree of freedom in designing hull 1 of personal watercraft 100 further improves.

Note that, first cable 11a according to the present embodiment may also be configured to include inner cable 11a2 and connection member 11a3 except outer casing 11a1. Even in the case of the configuration in the above-described manner, inner cable 11a2 is movable forward and backward since, for example, the use of a biasing member which assists in the rotation of trim 34 illustrated in FIG. 2 makes it possible to suppress deflection of inner cable 11a2 by the restoration force of the biasing member when inner cable 11a2 moves forward.

Further, second cable 12a according to the present embodiment may also be configured to include inner cable 12a2 and connection member 12a3 except outer casing 12a1. Even in the case of the above-described configuration, inner cable 12a2 is movable forward and backward since, for example, the use of a biasing member which assists in the rotation of reverse bucket 35 illustrated in FIG. 2 makes it possible to suppress deflection of inner cable 12a2 by the restoration force of the biasing member when inner cable 12a2 moves forward.

Further, cable driving part 140 according to the present embodiment may also be provided with, instead of the planetary gear mechanism, another gear mechanism that decelerates the rotation of a motor and transmits the rotational force thereof to a rotation member. Having said that, the provision of the planetary gear mechanism makes it possible to obtain a large reduction gear ratio with respect to the size of cable driving part 140. Accordingly, it is possible to produce cable driving part 140 which is small, but exhibits a large rotation torque.

As described above, actuator 10 according to the present embodiment is configured to include: casing 14; and a cable driving part including a rotation member connected to a cable. The cable driving part moves the cable forward and backward by rotating the rotation member with a force of a motor based on an operation signal. The cable extends from a water flow direction changing part and is inserted into casing 14. The water flow direction changing part changes a direction of a water flow to be ejected. The operation signal is an operation signal for operating the water flow direction changing part.

Since this configuration makes it possible to rotate a rotation member, which is connected to a cable, with a motor based on an operation signal, it is possible to move the cable forward and backward without utilizing a plurality of mechanical booster mechanisms. Accordingly, it is no longer necessary to provide hull 1 with a space in which a plurality of mechanical booster mechanisms can operate, and the degree of freedom in designing hull 1 improves.

Further, since a plurality of mechanical booster mechanisms becomes unnecessary, the weight of hull 1 can be reduced and further a reduction in the number of parts that form hull 1 makes it possible to reduce the production cost of hull 1.

Further, the reduction in the number of parts that form hull 1 improves the durability of hull 1, makes it possible to suppress an increase in the maintenance cost of hull 1, and significantly improves the reliability of hull 1.

Further, since the flexible cable is connected to the water flow direction changing part, it is possible to provide actuator 10 at a position away from the water flow direction changing part. Accordingly, a free space in hull 1 can be effectively utilized even in a case where actuator 10 is provided in hull 1 of a small size with a limited space for installing equipment.

For example, in a case where a non-flexible rod instead of the flexible cable is connected to the water flow direction changing part, actuator 10 is disposed in the vicinity of the water flow direction changing part. In this case, a space for installing the actuator in the vicinity of the water flow direction changing part is required, and the degree of freedom in designing hull 1 significantly decreases. Further, since the vicinity of the water flow direction changing part is a region where water is likely to enter, an additional waterproofing measure(s) to hull 1 or actuator 10 may be required.

In contrast, the utilization of the flexible cable makes an additional waterproofing measure(s) to hull 1 or actuator 10 unnecessary and makes it possible to reduce the production cost of hull 1. Further, since an improvement in the degree of freedom in the position at which actuator 10 is disposed makes it possible to reduce a risk that actuator 10 will be flooded, the maintenance cost of actuator 10 can be significantly reduced.

Note that, actuator 10 of the present embodiment is configured such that the length of rotation member 12m is longer than the length of rotation member 11m. This configuration causes the rotational radius of rotation member 12m to be larger than the rotational radius of rotation member 11m and makes it possible to cause the forward/backward amount of second cable 12a to be larger than the movement amount of first cable 11a. Accordingly, reverse bucket 35 whose rotation amount is larger than the rotation amount of trim 34 can be easily driven with a simple configuration without providing a mechanism, which changes the movement amount of second cable 12a, in the middle of second cable 12a extending toward reverse bucket 35.

Note that, for example, it is understood that the following aspects also belong to the technical scope of the present disclosure.

(1) An actuator includes: a casing; and a cable driving part including a rotation member connected to a cable. The cable driving part moves the cable forward and backward by rotating the rotation member with a force of a motor based on an operation signal. The cable extends from a water flow direction changing part and is inserted into the casing. The water flow direction changing part changes a direction of a water flow to be ejected. The operation signal is an operation signal for operating the water flow direction changing part.

(2) The water flow direction changing part includes a trim, which changes an inclination angle of a personal watercraft with respect to a horizontal direction, and a reverse bucket, which changes a traveling direction of the personal watercraft between a direction in which the personal watercraft moves forward and a direction in which the personal watercraft moves backward. The cable includes a first cable, which extends from the trim and is inserted into the casing, and a second cable, which extends from the reverse bucket, is a certain distance away from the first cable, and is inserted into the casing from an identical side from which the first cable is inserted into the casing. The cable driving part includes a first driving part, which moves the first cable forward and backward, and a second driving part, which moves the second cable forward and backward. The first driving part is disposed, inside the casing, in a region between the first cable and the second cable and at a position closer to a side where the first cable and the second cable are inserted into the casing than the second driving part is.

(3) The cable driving part further includes a control part disposed in the region, where the control part causes each of the first driving part and the second driving part to rotate. The first driving part is provided between the control part and the second driving part.

(4) The casing has an approximately rectangular parallelepiped shape in which a length of the casing along an extension direction of the first cable and the second cable is longer than a length of the casing in a direction orthogonal to the extension direction, and the first driving part and the second driving part are arranged along the extension direction.

(5) The cable driving part further includes a planetary gear mechanism that transmits rotation of the motor to the rotation member.

(6) The planetary gear mechanism includes an input gear, into which the rotation of the motor is input, and a plurality of planetary gears, which is arranged away from each other around the input gear and to which rotation of the input gear is transmitted. The rotation member includes an annular part formed in an annular shape so as to surround the plurality of planetary gears and including an internal gear that meshes with each of the plurality of planetary gears.

(7) The cable includes: an outer casing extending from inside the casing to outside the casing; an inner cable extending from the water flow direction changing part and being inserted into the casing via the outer casing; and a connection member connecting a leading end of the inner cable to the rotation member.

Various embodiments have been described above with reference to the accompanying drawings. However, it goes without saying that the present disclosure is not limited to these embodiments. It is obvious that one of ordinary skill in the art can conceive various modified examples and correction examples within the scope described in the present disclosure. It should be naturally understood that these modified examples and correction examples also belong to the technical scope of the present disclosure. Further, each component of the above embodiments may be arbitrarily combined without departing from the spirit of the present disclosure.

An embodiment has been described thus far. Note that, the above description is only examples of a preferred embodiment, and the scope of the embodiment is not limited thereto. That is, the descriptions of the configuration of the apparatus and the shape of each portion of the apparatus are examples, and it is apparent that various modifications and additions to these examples are possible in the scope of the embodiment.

INDUSTRIAL APPLICABILITY

The actuator and the cable assembly according to the present disclosure are capable of improving the degree of freedom in designing a hull.

REFERENCE SIGNS LIST

1 Hull
2 Prime mover
3 Propulsion mechanism
4 Drive shaft
10 Actuator
11 First cable driving part
11a First cable
11a1 Outer casing
11a2 Inner cable
11a3 Connection member
11b First motor
11c First driving part
11m Rotation member
12 Second cable driving part
12a Second cable
12a1 Outer casing
12a2 Inner cable
12a3 Connection member
12b Second motor
12c Second driving part
12d Housing
12e Rotation gear
12f Housing
12f1 Internal gear
12g Fastening member
12h Input gear
12h1 Internal gear
12h2 External gear 12*i* Planetary gear
12*i*1 First gear
12*i*2 Second gear
12*j* Carrier plate
12*k* Support shaft
12*l* Bush
12*l*1 Insertion shaft
12*m* Rotation member
12*m*1 Annular part
12*m*2 Arm
12*m*3 Insertion hole
12*m*4 Internal gear
12*m*5 Shaft part
12*m*6 Shaft part
12*n* Support plate
13 ECU
13*a* Cable group
13A Control part
13A1 First motor control part
13A2 Second motor control part
13A3 Reference position setting part
13B Storage part
14 Casing
14*a* Cable lead-in part
14*b* Cable lead-in part
14*c* Wiring lead-in part
15 Lid
16 Sealing member
17 Fastening member
31 Impeller shaft
32 Impeller
33 Nozzle
34 Trim
35 Reverse bucket
100 Personal watercraft
140 Cable driving part
141 Short side part
200 Cable assembly
A Region
CCD Second rotation direction
CD First rotation direction
D1 Extension direction
D2 Direction
$P_D$ Down position
$P_F$ Forward position
$P_N$ Neutral position
$P_R$ Reverse position
$P_U$ Up position
WF Water flow

What is claimed is:

1. An actuator, comprising:

a casing; and a cable driving part including a rotation member connected to a cable, the cable driving part moving the cable forward and backward by rotating the rotation member with a force of a motor based on an operation signal, the cable extending from a water flow direction changing part and being inserted into the casing, the water flow direction changing part changing a direction of a water flow to be ejected, the operation signal being an operation signal for operating the water flow direction changing part, wherein the water flow direction changing part includes a trim nozzle and a reverse bucket, the trim nozzle changing an inclination angle of a personal watercraft with respect to a horizontal direction, the reverse bucket changing a traveling direction of the personal watercraft between a direction in which the personal watercraft moves forward and a direction in which the personal watercraft moves backward, the cable includes a first cable and a second cable, the first cable extending from the trim nozzle and being inserted into the casing, the second cable extending from the reverse bucket, being a certain distance away from the first cable, and being inserted into the casing from an identical side from which the first cable is inserted into the casing, the cable driving part includes a first driving part and a second driving part, the first driving part moving the first cable forward and backward, the second driving part moving the second cable forward and backward, and the first driving part is disposed, inside the casing, in a region between the first cable and the second cable and at a position closer to a side where the first cable and the second cable are inserted into the casing than the second driving part is.

2. The actuator according to claim 1, wherein:

the cable driving part further includes a control part disposed in the region, the control part causing each of the first driving part and the second driving part to rotate, and the first driving part is provided between the control part and the second driving part.

3. The actuator according to claim 1, wherein:

the casing has an approximately rectangular parallelepiped shape in which a length of the casing along an extension direction of the first cable and the second cable is longer than a length of the casing in a direction orthogonal to the extension direction, and the first driving part and the second driving part are arranged along the extension direction.

4. The actuator according to claim 1, wherein the cable driving part further includes a planetary gear mechanism that transmits rotation of the motor to the rotation member.

5. The actuator according to claim 4, wherein:

the planetary gear mechanism includes an input gear and a plurality of planetary gears, the rotation of the motor being input into the input gear, the plurality of planetary gears being planetary gears which are arranged away from each other around the input gear and to which rotation of the input gear is transmitted; and the rotation member includes an annular part formed in an annular shape so as to surround the plurality of planetary gears and including an internal gear that meshes with each of the plurality of planetary gears.

6. A cable assembly comprising the actuator according to claim 1, wherein the cable includes: an outer casing extending from inside the casing to outside the casing; an inner cable extending from the water flow direction changing part and being inserted into the casing via the outer casing; and a connection member connecting a leading end of the inner cable to the rotation member.

\* \* \* \* \*